United States Patent Office 2,815,101
Patented Dec. 3, 1957

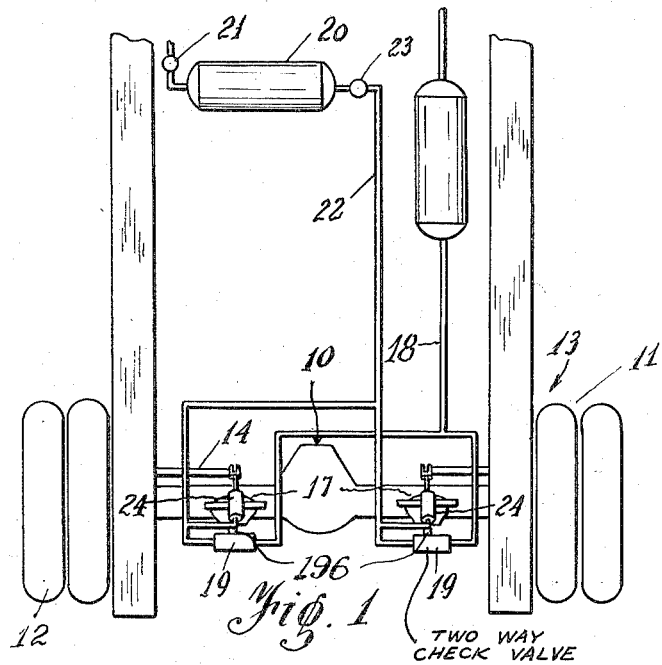
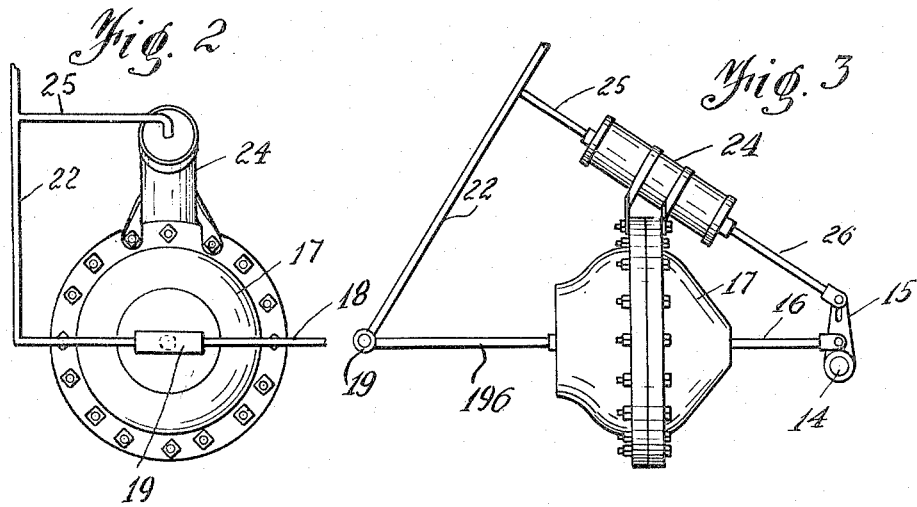

2,815,101

EMERGENCY BRAKES FOR TRUCKS OR THE LIKE

William C. Freiss, Pittsburgh, Pa., assignor, by direct and mesne assignments, to Freiss Safety Brake, Inc., Pittsburgh, Pa., a corporation of Pennsylvania Application January 15, 1954, Serial No. 404,351

3 Claims. (Cl. 188—106)

This invention relates to vehicle brakes and particularly to an emergency brake system adapted to be associated with conventional vehicle brake systems such as air brake systems used on trucks, trailers and the like.

There has long been a need for an emergency brake system adapted for use with conventional brake systems. This is particularly true in the case of trailer trucks and the like where the large and heavy loads make any brake failure a serious road hazard and frequently the source of a fatal accident.

An object of this invention is to provide an emergency brake system adapted to apply the brake upon failure of the conventional braking system.

Another object of the invention is to provide a pneumatically operated emergency brake mechanism adapted to operate the brake actuating diaphragm of a conventional air brake system upon failure of the conventional air supply.

A further object of the invention is to provide an emergency braking cylinder for actuating the brakes in the event of a failure in the diaphragm of the conventional air brake system.

Another object of the invention is to provide a pneumatically operated emergency air brake system adapted to automatically cut out the conventional system and cut in the emergency system.

Other objects and advantages of this invention will become apparent from the consideration of the following description and the accompanying drawings in which:

Figure 1 is a top plan view of the emergency brake system of this invention.

Figure 2 is a front elevation of a diaphragm and auxiliary brake cylinder of Figure 1.

Figure 3 is a side elevation of the diaphragm and auxiliary brake cylinder of Figure 2.

Referring to the drawings there is illustrated a rear truck axle assembly 10 carrying dual wheels 11 and 12 at opposite ends thereof. Each dual wheel assembly is provided with a brake shoe assembly 13 having a rotatable brake shoe arm 14 of conventional design. Each brake shoe arm 14 is provided with a crank arm 15 connected to the thrust arm 16 of an air actuated diaphragm 17 of conventional design. A conventional air supply and brake actuating system 18 (partly shown) is connected to each of the diaphragms 17 through a two way automatic check valve 19.

An emergency air tank or receiver means 20 is connected to the source of air (not shown) by a valve 21 which may be a check valve. An air line 22 passes from the air tank 20 through a control valve 23 to one side of the two way automatic check valve 19. A two way check valve of the type illustrated in Cox Patent 2,128,916 could be used, or a conventional spring loaded double ball valve or any of the various other well known two way check valves. An auxiliary operating cylinder 24 mounted on the diaphragm 17 is connected to the air line 22 by a by-pass line 25. A piston arm 26 is connected to the end of the crank arm 15.

When operating as an ordinary brake system the air passes through the conventional air supply 18, through the two way check valve 19 through line 196 into the diaphragm 17 which moves the thrust arm 16 to rotate the crank arm 15 and thereby the brake shoe arm 14 to apply the brakes. In case of a failure in the brake system 18, the operator opens the valve 23 to release the air pressure from tank 20 into line 22 which passes through the check valve 19 to actuate the diaphragm 17 at the same time air from line 22 enters piston 24 through line 25 and thereby actuates the piston arm 26 to rotate crank 15 and thereby brake shoe arm 14 to apply the brakes. In this way the brakes are applied regardless of the point of failure. A failure of diaphragm 17 is compensated for by piston 24. A failure in the system other than the diaphragm is compensated for by the tank 20 and line 22.

While a preferred embodiment of this invention has been illustrated and described above it will be understood that it may be otherwise embodied within the scope of the following claims.

I claim:

1. In a brake system for vehicles having wheels equipped with brake shoes, a rotatable brake lever operating said brake shoes, diaphragm means for operating said brake lever and a source of fluid under pressure for actuating said means, an emergency braking system comprising receiver means taking fluid from the source of fluid under pressure and retaining said fluid at the receiving pressure, connections between the receiver means and the diaphragm means, means normally closing said connections adjacent the diaphragm whereby fluid is prevented from entering said connections, piston means connected to said connections and receiving fluid therefrom, said piston means joined to the brake lever for rotating it and valve means actuable by an operator between the receiver and said connections whereby fluid is delivered to the diaphragm and piston means for operating said brake lever upon a failure in the source of fluid under pressure.

2. An emergency brake system for vehicles as claimed in claim 1 wherein the means normally closing the connections adjacent the diaphragm is a two way check valve.

3. In a brake system for vehicles having wheels equipped with brake shoes, a rotatable brake lever operating said brake shoes, diaphragm means for operating said brake lever and a source of air under pressure for actuating said diaphragm means, an emergency braking system comprising receiver means taking air from the source of air under pressure and retaining air at the receiving pressure, valve means on the receiver means, connections between said valve means and the diaphragm means, check valve means on the diaphragm connecting the source of air under pressure to said diaphragm means and the connections between the valve means, said check valve being arranged to automatically open the diaphragm to the portion of the valve under higher pressure and piston means in parallel with the diaphragm means simultaneously receiving air from the receiver means, said piston means being joined to the brake lever for rotating it.

References Cited in the file of this patent

UNITED STATES PATENTS

| | | |
|---|---|---|
| 2,128,916 | Cox | Sept. 6, 1938 |
| 2,240,166 | Stanley | Apr. 29, 1941 |
| 2,394,343 | Vorech | Feb. 5, 1946 |
| 2,416,222 | Rodway | Feb. 18, 1947 |
| 2,578,388 | Ambler | Dec. 11, 1951 |
| 2,645,313 | Schaadt | July 14, 1953 |
| 2,649,169 | Holman | Aug. 18, 1953 |